United States Patent
Funato et al.

(10) Patent No.: US 7,635,543 B2
(45) Date of Patent: Dec. 22, 2009

(54) LEAD-ACID BATTERY AND MANUFACTURING METHOD THEREOF

(75) Inventors: Takayuki Funato, Kyoto (JP); Junpei Yamashita, Kyoto (JP)

(73) Assignee: GS Yuasa Corporation, Kyoto (JP)

( * ) Notice: Subject to any disclaimer, the term of this patent is extended or adjusted under 35 U.S.C. 154(b) by 367 days.

(21) Appl. No.: 10/577,220

(22) PCT Filed: Oct. 27, 2004

(86) PCT No.: PCT/JP2004/016282

§ 371 (c)(1), (2), (4) Date: Apr. 26, 2006

(87) PCT Pub. No.: WO2005/041342

PCT Pub. Date: May 6, 2005

(65) Prior Publication Data

US 2007/0077497 A1    Apr. 5, 2007

(30) Foreign Application Priority Data

Oct. 28, 2003  (JP) .............................. 2003-367255
Nov. 25, 2003  (JP) .............................. 2003-394220

(51) Int. Cl.
  *H01M 6/04* (2006.01)
  *H01M 2/16* (2006.01)
(52) U.S. Cl. ...................... 429/347; 429/204; 429/252; 429/188
(58) Field of Classification Search ............. 429/48, 429/49, 50, 188, 252
See application file for complete search history.

(56) References Cited

U.S. PATENT DOCUMENTS

| 4,216,281 A | * | 8/1980 | O'Rell et al. ............... 429/252 |
| 5,677,075 A | * | 10/1997 | Fujita ........................... 429/48 |
| 2003/0165733 A1 | | 9/2003 | Takehara et al. |

FOREIGN PATENT DOCUMENTS

| JP | 59-46761 A | 3/1984 |
| JP | 4-43570 A | 2/1992 |
| JP | 5-242910 A | 9/1993 |
| JP | 8-185886 A | 7/1996 |
| JP | 2002-8618 A | 1/2002 |

OTHER PUBLICATIONS

Laird, Edwin C., Samir B. Hanna. "Analysis of 4.5 mol/L sulfuric acid for organic compounds leached from battery separators." National Bureau of Standards Special Publication 519. Trace Organic Analysis: A New Frontier in Analytical Chemistry. Proceedings of the 9th Materials Research Symposium. 797-802. Apr. 10-13, 1978.*
International Search Report for PCT/JP04/016282 dated Feb. 15, 2005.
Chinese Office Action dated May 9, 2008.
Chinese Office Action dated Jul. 10, 2009.

* cited by examiner

*Primary Examiner*—Dah-Wei D Yuan
*Assistant Examiner*—Zachary Best
(74) *Attorney, Agent, or Firm*—Sughrue Mion, PLLC (57) ABSTRACT

A lead-acid battery which comprises a positive electrode, a negative electrode, a separator and an electrolyte, wherein the electrolyte contains volatile organic acid and the content of volatile organic acid is 250 mg or lower per liter of the electrolyte. The present invention can improve the performance of the lead-acid battery.

7 Claims, 4 Drawing Sheets

LEAD-ACID BATTERY AND MANUFACTURING METHOD THEREOF

This is a National Stage application under 35 U.S.C. 371 of PCT/JP04/016282 filed Oct. 27, 2004, which claims priority from Japanese patent application Nos. 2003-367255 filed on Oct. 28, 2003 and 2003-394220 filed Nov. 25, 2003, all of which are incorporated herein by reference.

TECHNICAL FIELD

The present invention relates to a lead-acid battery.

BACKGROUND ART

Lead-acid batteries date back more than 100 years. Although new secondary batteries such as nickel-metal hydride batteries and lithium-ion batteries have recently been developed, lead-acid batteries are constantly in high demand due to their stability and cost performance. It is still hoped that a lead-acid battery will have a larger capacity and an improved battery life.

Conventionally, in order for a lead-acid battery to have a larger capacity or an improved battery life, usage types of lead-acid batteries have typically been reviewed so as to employ a design suitable for the various types. Since an appropriate design thus tailored to the various usage types of lead-acid batteries requires amendments to the designs of the current collector and of the electrode plates, and review of the battery container design as a whole, a long time and much expense are involved in verifying the designs.

Consequently, in order to increase capacity and improve battery life without any amendment to lead-acid battery designs, methods whereby a chemical is added to a lead-acid battery have been studied. Although various suggestions have been made in the past, most of which are disadvantageous in that they are insufficiently effective or too expensive, only a limited number of the practical applications thereof have been made commercially available. In light of such a situation, there has been a demand for the development of a chemical which can increase the capacity of a lead-acid battery and improve its battery life by a simple method.

DISCLOSURE OF THE INVENTION

It is an object of the present invention to provide a lead-acid battery with a larger capacity and an improved battery life by a simple method without the need for any amendment to lead-acid battery designs.

Volatile organic acid dissolves a grid made of lead or lead alloy composing a lead-acid battery, and also the active material. For this reason, volatile organic acid is harmful to a lead-acid battery. It has been found, however, that at a specific concentration, the volatile organic acid contained in the electrolyte becomes effective in increasing the capacity of the lead-acid battery and improving the battery life thereof. Specifically, for example, acetic acid reacts with lead to become lead acetate. If acetic acid is present at a high concentration, a grid made of lead continuously corrodes, thereby making the grid thinner, which is unfavorable to the lead-acid battery. However, if acetic acid is at a specific concentration, corrosion does not proceed continuously, thereby allowing the grid to be dissolve only partially, which does not matter. Instead, since the surface of a grid remains partially dissolved, the surface area of the grid is increased, so that the adhesion between the active material and the grid improves, thereby improving the battery life. The active material also dissolves only partially, thereby increasing the surface area of the active material. At the same discharge rate, therefore, a larger capacity can be obtained from a lead-acid battery having an active material with an increased surface area.

The present inventors have found that the volatile organic acid concentration which can obtain such an effect is 250 mg/L or lower. The causes thereof are given in Examples to be described later. It should be noted that the unit mg/L means that 1 milligram of volatile organic acid is contained per liter of electrolyte. The volatile organic acid means an organic compound with a carboxyl group (—COOH), whose molecular weight is 100 or lower. Specifically, HCOOH, $CH_3COOH$, $C_2H_5COOH$, n-$C_3H_7COOH$, and iso-$C_3H_7COOH$ are meant here.

There are two methods available for containing volatile organic acid in electrolyte as follows.

One is the method of pouring an electrolyte, to which volatile organic acid is added, into a lead-acid battery. As to when to add volatile organic acid, addition may be performed either during initial charge or container formation, or after initial charge or container formation. If volatile organic acid is added before initial charge or container formation, since decomposed by charge, an adjustment has to be made so that the volatile organic acid concentration will be 250 mg/L after initial charge or container formation.

The other method is performed by employing a member for producing volatile organic acid in a lead-acid battery. Specifically, a separator which contains a specific surfactant is employed in a lead-acid battery. The surfactant is more subject to oxidation of dilute sulfuric acid and to anode oxidation of the positive electrode than are resins such as polyethylene to be employed for a separator base. As a result, the surfactant decomposes to produce volatile organic acid. The present inventors focus attention on this point. It is possible, therefore, for an electrolyte to contain volatile organic acid by way of employing a separator containing a specific surfactant for the lead-acid battery.

Examples of surfactants which produce volatile organic acid through oxidation of dilute sulfuric acid and anode oxidation of the positive electrode include di-2-ethylheptyl sodium sulfosuccinate and di-2-methylheptyl sodium sulfosuccinate. Therefore, in the stage of mixing the materials of the separator, in which silica powder, mineral oil and plasticizer are mixed with a resin such as polyethylene or polypropylene having a high molecular weight, these surfactants may also be added thereto. After the mixture is extruded into a sheet, any excess surfactant is removed therefrom by extraction using an organic solvent such as trichloroethylene or hexane so as to obtain a separator containing a prescribed amount of surfactant.

Containing a surfactant in a separator, however, does not ensure that the concentration of the volatile organic acid contained in the electrolyte of a lead-acid battery becomes 250 mg/L or lower. Specifically, the concentration of the volatile organic acid contained in the electrolyte of a lead-acid battery varies depending on the amount of surfactant added to the separator. The volatile organic acid concentration also varies with time. The causes thereof are described hereinafter.

Figure 8:
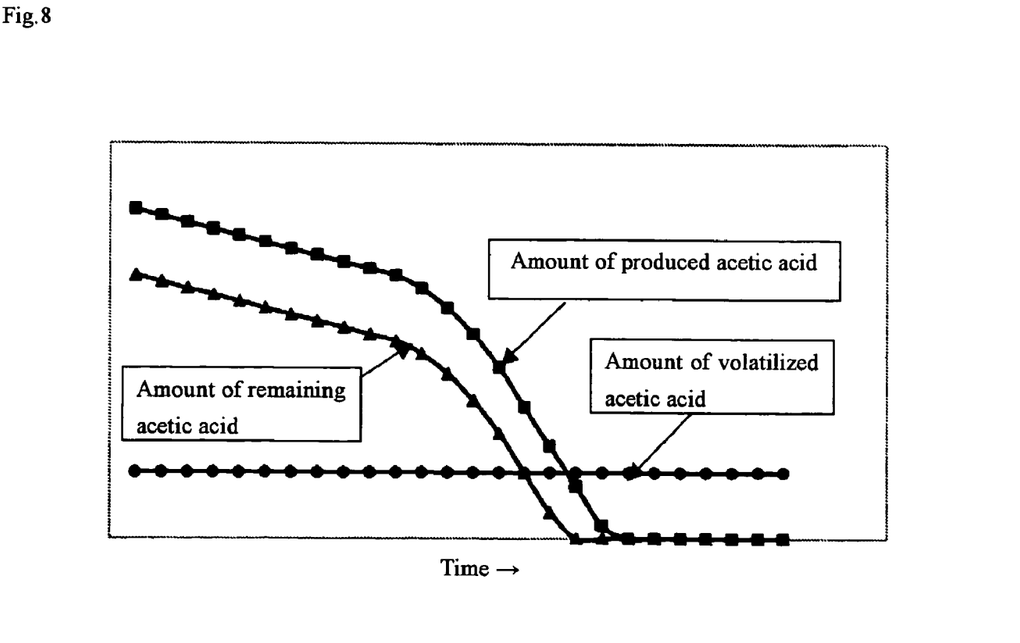
FIG. 8 shows the variations with time of the produced amount, volatilized amount and remaining amount of acetic acid.

The present inventors investigated the concentration over time of the volatile organic acid which comes from the separator composing a lead-acid battery. In this case, the concentration of acetic acid was investigated. The results of the investigation show that acetic acid is produced when a lead-acid battery is initially charged and subsequently left, and that acetic acid production stops after a set period of time. FIG. 8 shows the relation schematically. In FIG. 8, reference mark ■ means an amount of produced acetic acid, ▲ an amount of remaining acetic acid and ● an amount of volatilized acetic acid. FIG. 8, which is a schematic diagram, does not show specific values for the vertical and horizontal axes. As is clear from FIG. 8, the amount of acetic acid produced due to surfactant oxidation becomes large immediately after initial charge or container formation. The produced amount decreases over time to reach a slight value after a certain period of time. Since acetic acid is volatile and its volatilization amount is substantially constant, the concentration of the acetic acid in a lead-acid battery gradually decreases to become the detection limit or lower finally. However, the concentration of the acetic acid left in a lead-acid battery immediately after initial charge or container formation for a certain period of time (normally one to several months) sometimes has a detrimental effect on the lead-acid battery. Therefore, the content volatile organic acid has to be controlled.

Consequently, the present application also discloses a method of controlling the concentration of volatile organic acid. Specifically, a description is given herein for the following method: a lead-acid battery which employs a separator containing a surfactant is container-formed; left at 40° C. or higher for 12 hours or longer; and charged either with an electrical quantity equal to the rated capacity or larger, or with an electrical quantity equivalent to 30% of the theoretical capacity of the positive active material provided in the positive electrode. According to the method, a lead-acid battery is left in a high-temperature environment so that the surfactant contained in the separator can fully be extracted into the electrolyte, and the positive active material acting as an oxidizer can be made to oxidize the surfactant partially. The partially remaining surfactant may be further oxidized either by charging with an electrical quantity equal to the rated capacity or larger, or by charging with an electrical quantity equivalent to 30% of the theoretical capacity of the positive active material. Since this oxidizes the extracted surfactant to volatile organic acid, thereby further oxidizing the volatile organic acid to water and carbon dioxide, the concentration of the volatile organic acid contained in the electrolyte of the lead-acid battery can become 250 mg/L or lower in the result.

If a lead-acid battery is left at a high temperature, the surfactant oxidizes quickly. Therefore, the lead-acid battery is preferably left at 40° C. or higher, higher than room temperature. On the other hand, since a polyethylene separator softens or deforms at 75° C. or higher, and the resin employed for the container of the lead-acid battery such as polypropylene, ABS or polyethylene also softens or deforms at 75° C. or higher, the lead-acid battery is preferably left at a temperature lower than 75° C. As is clear from the above, the lead-acid battery is preferably left within the temperature range from 40° C. or higher, to lower than 75° C. However, if the material of the separator or the container to be employed is replaced with another material, the upper limit of the preferable temperature range changes accordingly.

If the lead-acid battery is left is for 12 hours or less, the surfactant contained in the separator is not fully extracted. The battery, therefore, has to be left for 12 hours or longer. On the other hand, when 72 hours passes, the concentration of the volatile organic acid in the electrolyte begins to decrease. This is considered to be due to the fact that oxidative decomposition of the volatile organic acid begins gradually even during leaving the battery while the volatile organic acid is not extracted.

If the lead-acid battery is charged with an electrical quantity equal to the rated capacity or smaller after being left, the volatile organic acid remains undecomposed. On the other hand, if charging with an electrical quantity twice as large as the rated capacity, most of the volatile organic acid is decomposed. For charging, therefore, an electrical quantity equal to the rated capacity or larger is required, while an electrical quantity twice as large as the rated capacity or larger is not required. If the lead-acid battery is charged with an electrical quantity equivalent to 30% of the theoretical capacity of the positive active material provided in the positive electrode, the same result was obtained as in charging with an electrical quantity equivalent to the rated capacity.

The conventional arts relating to such a lead-acid battery pertaining to acetic acid are disclosed in Japanese Unexamined Patent Publications No. H6-5278A and No. H4-43570A.

Japanese Unexamined Patent Publication No. H6-5278A describes the two following procedures. One is that, in a method of manufacturing a electrode plate for a lead-acid battery by filling an active material paste in a current collector made of lead or lead alloy through curing, basic lead carbonate is produced on the surface of the current collector before filling the active material paste. The other is that a current collector is exposed to acetic acid vapor so as to produce basic lead acetate on the surface of the current collector, followed by exposing the current collector to carbon dioxide so as to produce basic lead carbonate (white lead). Although Japanese Unexamined Patent Publication No. H6-5278A discloses that a lead-acid battery employs acetic acid, acetic acid is used for manufacturing its electrode plate. Specifically, basic lead acetate is produced by exposing the lead current collector to acetic acid vapor; and basic lead carbonate (white lead) is then produced by exposing the current collector to carbon dioxide. White lead, which has a higher solubility in an active material than Pb or PbO, becomes PbO on the surface of a grid filled with the active material so as to obtain a stronger adhesion between the current collector and the active material in a short time. Therefore, acetic acid is not present in the electrolyte, but present on the grid surface as basic lead acetate.

Japanese Unexamined Patent Publication No. H4-43570A discloses a "method of manufacturing a sealed lead-acid battery which retains an electrolyte in positive/negative electrode plates and a separator, and which controls the amount of electrolyte so as not to have a free solution, by charging supplementarily at room temperature, after initial charge, after leaving in an atmosphere of 50 to 80° C.;" and that "the battery is left in an atmosphere of 50 to 80° C. for 10 days or shorter." A sealed lead-acid battery, which is characterized in that an electrolyte is retained in the positive/negative active materials and the separator without any free electrolyte, requires a separator with a high porosity and an excellent electrolyte retainability. In order to meet the requirements, the separator is commonly made of a sheet of ultra thin glass fibers with a diameter of 10 μm or thinner. The glass fibers are chemically stable. The glass fibers, therefore, are also stable toward oxidation of dilute sulfuric acid or anode oxidation of the positive electrode, without any volatile organic acid elution. Accordingly, no volatile organic acid is present in the electrolyte of the lead-acid battery.

BRIEF DESCRIPTION OF DRAWINGS

In FIG. 4, reference numeral 1 denotes a distillation flask, 2 a copper steam generator, 3 a cooler, and 4 a graduated cylinder.

BEST MODE FOR CARRYING OUT THE INVENTION

Prior to describing Examples of the present invention, a description is given for terms used in the typical manufacturing steps and Examples of a lead-acid battery.

As the positive and negative electrode current collectors of a lead-acid battery, a current collector made of lead or lead alloy is employed. The positive electrode current collector retains lead dioxide while the negative electrode current collector retains spongy, metallic lead. An electrode plate is manufactured therein respectively. The electrode plates are then laminated or wound through a separator so as to form an electrode plate group. The electrode plate group is accommodated in a container, followed by pouring an electrolyte containing a dilute sulfuric acid solution as its main element, into the container. A lead-acid battery is thus manufactured.

In this case, the electrode plate for the lead-acid battery is manufactured by filling a pasty material for the positive electrode and a pasty material for the negative electrode in each of the positive electrode grid and the negative electrode grid, through curing and drying steps as required. The electrode plate, which cannot generate electric power at this moment, is called "unformed electrode plate." Electric energy is given to the unformed electrode plate so as to cause oxidative and reductive reactions electrochemically, thereby producing lead dioxide at the positive electrode and lead (commonly called spongy lead) at the negative electrode. The unformed electrode plate thus becomes a formed electrode plate capable of generating electric power.

There are commonly two methods available for this step.

One is the method in which unformed positive and negative electrode plates are previously charged in a tank filled with dilute sulfuric acid. This method is called "tank formation." The electrode plate which has completed the tank formation step is called "formed electrode plate." The formed electrode plates undergo washing and drying steps. The formed electrode plate is then laminated through a separator so as to form an electrode plate group. The electrode plate group further composes the lead-acid battery. The lead-acid battery, which partially oxidizes during drying the negative electrode plate, sometimes loses a slight part of its capacity. Consequently, in order to ensure that the lead-acid battery has its prescribed capacity, the battery is further charged after filling an electrolyte therein. This charge is called "initial charge."

The other is the method in which positive and negative electrode plates, or unformed electrode plates, are laminated or wound through a separator so as to form a electrode plate group; the electrode plate group is inserted in a container, followed by filling dilute sulfuric acid therein; and the battery is charged with an electrical quantity equal to or larger than 250% of the theoretical capacity of the positive electrode plate so as to enable the lead-acid battery to generate electric power. This method is called "container formation."

Based on the above description, Examples of the present invention will be described in detail.

EXAMPLE 1

In Example 1, a test was conducted by employing 46B24L lead-acid batteries for an automobile, with 36 Ah at $C_5$ (C: rated capacity; 5:5 hour rate) adhering to JIS D5301. In this case, the rated capacity means the value obtained by obtaining the discharge current value at which 5 hours±15 minutes is required for discharging the battery down to a terminal voltage of 1.7 V/cell, and then multiplying the discharge current value by five. The rated capacity is expressed in Ah as its unit and normally expressed in alphabet C. The letter N expresses as $C_N$ means an hour rate, and $C_N$ means the rated capacity at the hour rate.

Positive and negative electrode plates were manufactured by a fixed method, and formed previously in a tank. The manufactured positive and negative electrode plates were laminated through a separator so as to form a 46B24L electrode plate group. For the separator, a sheet of glass fibers with a diameter of 1 μm or thinner. The electrode plate group was inserted in a container made of polypropylene resin, and a lid made of polypropylene resin was welded to the container.

Acetic acid was employed as volatile organic acid. Acetic acid was added to sulfuric acid having a specific gravity of 1.280 so as to have a prescribed concentration, followed by agitation, so that an electrolyte was prepared. Table 1 shows the prescribed concentration. The electrolyte was poured into the lead-acid battery. The lead-acid battery was then charged with an electrical quantity equivalent to the rated capacity (an electrical quantity of 36 Ah in this Example) by initial charge.

The result is shown in Table 1. In Table 1, the columns shown as the "acetic acid concentration (mg/L)" indicate values quantitatively analyzed after the initial charge.

A description is given here for the method of analyzing volatile organic acid quantitatively.

Various methods are available for analyzing volatile organic acid quantitatively. Among the methods, steam distillation is suitable for quantitatively analyzing the volatile organic acid (acetic acid) in dilute sulfuric acid. Also in this Example, therefore, quantitative analysis was performed by steam distillation. The procedure of steam distillation is as follows.

(1) 50 milliliter (hereinafter, abbreviated as mL) of sample solution is poured into a distillation flask.

(2) Vapor of a volume large enough to obtain 100 mL of distillate per ten minutes is sent, and the sample solution is heated so that the amount of solution will be maintained virtually constant. The distillation is finished when 300 mL of distillate is obtained.

(3) The distillate is titrated with 1/10 or 1/50 $Ba(OH)_2$ normal solution. As the indicator in this case, phenolphthalein or bromthymol blue is employed. The value for the result of a blank test is subtracted from the value obtained by titration so as to calculate the amount (mL) of consumed 1/10 $Ba(OH)_2$ normal solution relative to 1 L dilutes sulfuric acid. The calculated amount is set to the amount of volatile organic acid.

(4) The blank test means a testing method in which the steps (1), (2) and (3) are performed on 50 mL of dilute sulfuric acid containing no volatile organic acid.

Figure 4:
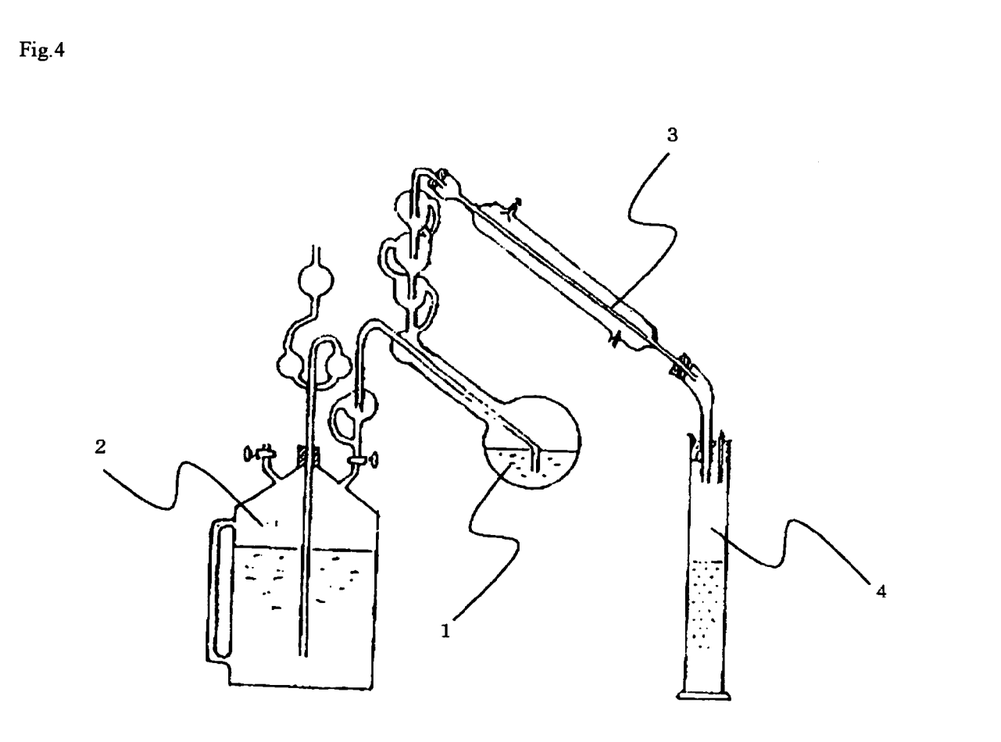
FIG. 4 is a schematic diagram showing an apparatus for analyzing volatile organic acid quantitatively by steam distillation.

For the apparatus to be employed for the analysis by steam distillation, the apparatus designed in conformity to JIS C2310 to 1953 (defined in 1962) was employed. FIG. 4 shows a schematic diagram of the apparatus.

The result obtained by qualitatively analyzing the volatile organic acid by ion chromatography, which was analyzed quantitatively by this method, identifies the volatile organic acid as acetic acid. Therefore, the concentration of the volatile organic acid obtained by steam distillation is expressed in mL/L. In Examples of the present invention, however, since the volatile organic acid was identified as acetic acid, the concentration of the volatile organic acid in the electrolyte is expressed in mg/L by the conversion based on the molecular weight of acetic acid.

Figure 2:
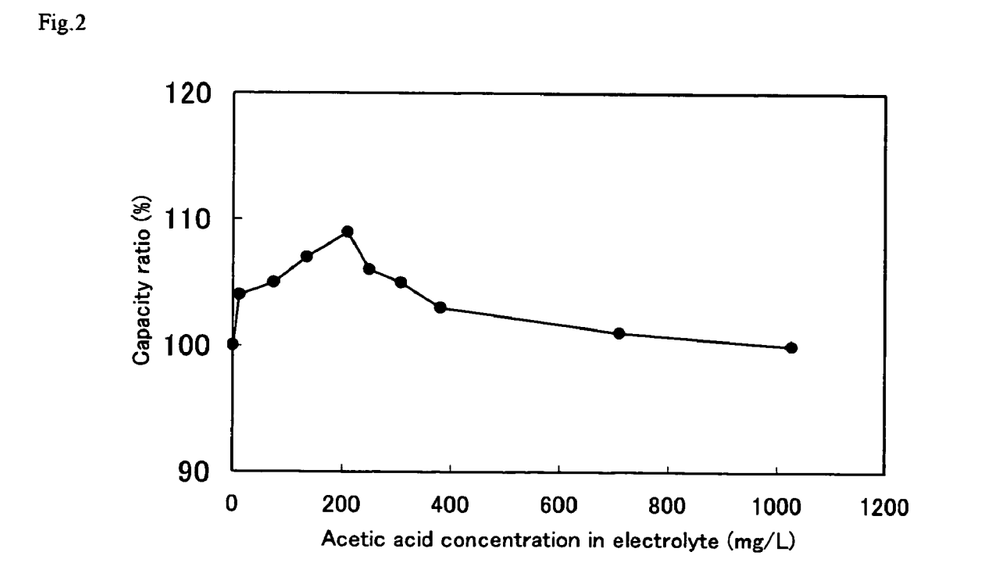
FIG. 2 shows a relation between the concentration of volatile organic acid and a capacity ratio.

Next, the capacity of the lead-acid battery was checked at 5 hour rate ($C_5$) (discharged down to a final voltage of 1.7 V/cell with a current of 7.2 A). The capacity was checked at 25° C. Table 1 and FIG. 2 show the result. The capacity at 5 hour rate is expressed by the rate in which the capacity of the conventional battery to which no acetic acid is added, is assumed to be 100.

TABLE 1

| No. | Prescribed acetic acid concentration (mg/L) | Acetic acid concentration (mg/L) | 5 hour rate capacity | Note |
| --- | --- | --- | --- | --- |
| 1 | 0 | 0 | 100 | Conventional battery |
| 2 | 15 | 12 | 104 | Battery of the invention |
| 3 | 50 | 38 | 104 | Battery of the invention |
| 4 | 100 | 74 | 105 | Battery of the invention |
| 5 | 200 | 135 | 107 | Battery of the invention |
| 6 | 250 | 174 | 108 | Battery of the invention |
| 7 | 300 | 209 | 109 | Battery of the invention |
| 8 | 350 | 250 | 106 | Battery of the invention |
| 9 | 450 | 308 | 105 | Battery for comparison |
| 10 | 500 | 348 | 104 | Battery for comparison |
| 11 | 550 | 382 | 103 | Battery for comparison |
| 12 | 1000 | 710 | 101 | Battery for comparison |
| 13 | 1500 | 1028 | 100 | Battery for comparison |

As shown in Table 1 and FIG. 2, only by containing acetic acid of a trace amount of 12 mg/L in the electrolyte, the capacity was improved by 4%. As the concentration of the acetic acid increased, the capacity tended to increase. However, the capacity of the lead-acid battery in which the acetic acid concentration is 250 mg/L, was slightly smaller than the capacity the lead-acid battery in which the concentration is 209 mg/L. From the result described above, it is found that the capacity increased when the acetic acid concentration was 710 mg/L or lower. The range within which the capacity particularly increased was from 135 to 209 mg/L.

Next, the lead-acid batteries were used for a light-load life test adhering to JIS D 5301 at 75° C. The test conditions are shown below.

(Life Test Conditions)

Discharge: 25 A for four minutes

Charge: 25 A for ten minutes (constant voltage: 14.8V)

Temperature: at 40 to 45° C. in a water tank

Figure 1:
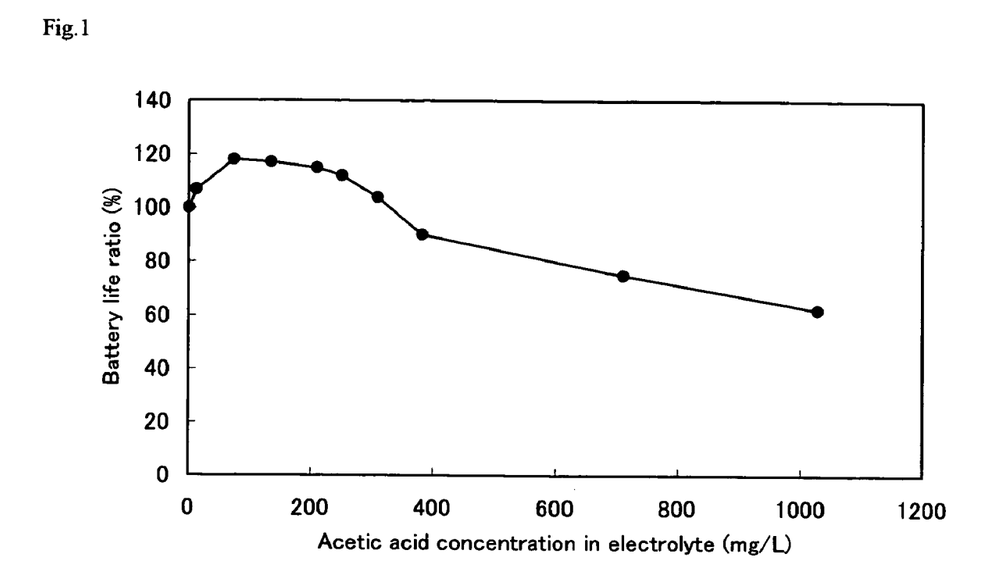
FIG. 1 shows a relation between a concentration of volatile organic acid and a battery life ratio.

The test result is shown in Table 2 and FIG. 1. The number of cycles is expressed by assuming that the conventional battery's number is 100.

TABLE 2

| No. | Acetic acid concentration mg/L | Number of life cycles at 75° C. with JIS light load | Note |
| --- | --- | --- | --- |
| 1 | 0 | 100 | Conventional battery |
| 2 | 12 | 107 | Battery of the invention |
| 3 | 38 | 112 | Battery of the invention |
| 4 | 74 | 118 | Battery of the invention |
| 5 | 135 | 117 | Battery of the invention |
| 6 | 174 | 117 | Battery of the invention |
| 7 | 209 | 115 | Battery of the invention |
| 8 | 250 | 112 | Battery of the invention |
| 9 | 308 | 100 | Battery for comparison |
| 10 | 348 | 95 | Battery for comparison |
| 11 | 382 | 90 | Battery for comparison |
| 12 | 710 | 75 | Battery for comparison |
| 13 | 1028 | 62 | Battery for comparison |

As shown in Table 2 and FIG. 1, the life properties of No. 2 to 8 lead-acid batteries according to the present invention improved by 7 to 18% relative to the battery life of No. 1 lead-acid battery as a conventional battery. However, No. 9 lead-acid battery having a concentration of 308 mg/L is shorter in life than the battery having a concentration of 250 mg/L. The life of the lead-acid battery having a concentration of 348 mg/L was shorter than the conventional battery.

Based on the result described above, in order to improve a battery life, acetic acid is preferably added with a concentration of 250 mg/L or lower. The particularly preferable concentration range of acetic acid was 74 to 174 mg/L.

From the results shown in Table 1 and Table 2, in order both to increase a capacity and to improve a battery life, the concentration of the acetic acid contained in the electrolyte is preferably 250 mg/L or lower.

Here, No. 10 to 13 lead-acid batteries shown in Table 2, which were shorter in life than the conventional battery, were disassembled so as to observe the cross sections of their electrode plates. As a result, it was found that the batteries had a severe corrosion in the grid, and that acetic acid was harmful to the batteries. On the other hand, in No. 2 to 8 lead-acid batteries in which their lives were improved, an active material layer was left around the grid and no crack was found between the grid and the active material. It is conceivable that a proper amount of acetic acid contained in the electrolyte strengthened the adhesion between the grid and the active material.

Furthermore, an overcharge test was conducted in a water tank at 75° C. with 0.1 CA (3.6 A) for 28 days. The batteries were disassembled after the test. A positive active material and a corrosion layer were removed from the grid physically and chemically. The weight (g) of the grid was measured after the removal. The weight was subtracted from the weight (g) of the grid before the test so as to set the obtained value to the corrosion weight of the grid. The corrosion weight was converted back into the ratio (%) before the test. Table 3 shows the result.

TABLE 3

| No. | Acetic acid concentration mg/L | Corrosion weight % | Note |
|---|---|---|---|
| 1 | 0 | 22 | Conventional battery |
| 2 | 12 | 21 | Battery of the invention |
| 3 | 38 | 21 | Battery of the invention |
| 4 | 74 | 22 | Battery of the invention |
| 5 | 135 | 21 | Battery of the invention |
| 6 | 174 | 21 | Battery of the invention |
| 7 | 209 | 21 | Battery of the invention |
| 8 | 250 | 22 | Battery of the invention |
| 9 | 308 | 24 | Battery for comparison |
| 10 | 348 | 25 | Battery for comparison |
| 11 | 382 | 29 | Battery for comparison |
| 12 | 710 | 33 | Battery for comparison |
| 13 | 1028 | 37 | Battery for comparison |

As shown in Table 3, No. 2 to 8 batteries according to the present invention had no difference in corrosion weight from the conventional battery containing no acetic acid. Specifically, acetic acid had no deleterious effect on overcharge. On the other hand, the corrosion weights of No. 9 to 13 lead-acid batteries having an acetic acid concentration of 308 mg/L or higher increased remarkably. It has become clear that a higher acetic acid concentration causes a remarkable corrosion.

EXAMPLE 2

In Example 2, lead-acid batteries of the same type as in Example 1 were prepared. Specifically, they were 46B24L (12V) lead-acid batteries for an automobile with a rated capacity of 36 Ah at 5 hour rate. It should be noted that di-2-ethylheptyl sodium sulfosuccinate or di-2-methylheptyl sodium sulfosuccinate is added as a surfactant to the separator of the lead-acid batteries at the ratio shown in Table 5 as the "surfactant additive rate" columns. The surfactant additive rate means the weight ratio of the surfactant relative to the total weight of polyethylene resin, silica powder, oil, phenolic resin, and the surfactant as raw materials.

The lead-acid batteries prepared by employing such a separator were container-formed. The concentration of the volatile organic acid contained in the electrolyte of the lead-acid battery was analyzed quantitatively 80 days after. Table 4 shows the result.

TABLE 4

| No. | Type of surfactant | Surfactant additive rate wt % | Volatile organic acid concentration 80 days after mg/L |
|---|---|---|---|
| 1 | Di-2-ethylheptyl sodium sulfosuccinate | 0 | 0 |
| 2 |  | 0.2 | 52 |
| 3 |  | 0.5 | 128 |
| 4 |  | 1.0 | 248 |
| 5 |  | 1.5 | 372 |
| 6 | Di-2-methylheptyl sodium sulfosuccinate | 0 | 0 |
| 7 |  | 0.2 | 39 |
| 8 |  | 0.5 | 105 |
| 9 |  | 1.0 | 168 |
| 10 |  | 1.5 | 259 |

As a result, when a lead-acid battery was manufactured by employing the separator manufactured at a di-2-ethylheptyl sodium sulfosuccinate additive rate of 0.2 wt % to 1.0 wt %, and when a lead-acid battery was manufactured by employing the separator manufactured at a di-2-methylheptyl sodium sulfosuccinate additive rate 0.2 wt % to 1.0 wt %, the amount of volatile organic acid contained in the electrolyte of the lead-acid battery was 250 mg/L or smaller. From the fact described above, by controlling the additive rate of the surfactant contained in the separator to be employed for the lead-acid battery, it is possible for the concentration of the volatile organic acid in the electrolyte to become 250 mg/L or lower.

Figure 3:
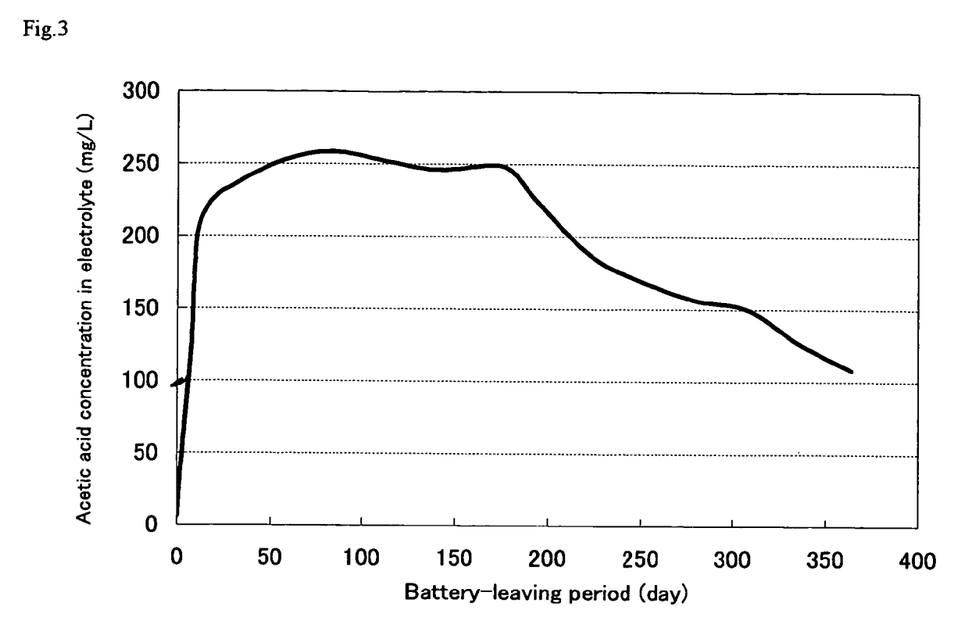
FIG. 3 shows a relation between a period when a battery is left and a concentration of the volatile organic acid in an electrolyte.

An investigation was conducted on the progression of the volatile organic acid concentration of No. 10 lead-acid battery shown in Table 4. The investigation period was one year from the initial charge. FIG. 3 shows the result. According to FIG. 3, only a slight amount of volatile organic acid was contained in the electrolyte after container formation. After that, volatile organic acid increased gradually with time to reach about 259 mg/L as its maximum value about 80 days after. The value was maintained for about half a year. After half a year passed, however, the concentration began to decrease, reaching about 100 mg/L one year after.

The result implies as follows. The surfactant eluted from the separator is oxidized by the lead dioxide of the positive electrode plate, thereby increasing volatile organic acid continuously. At a certain point, however, the increase and the decrease due to further oxidation reach equilibrium. Also, since the volatile organic acid concentration decreased when half a year passed, the surfactant to be eluted from the separator was exhausted; the surfactant was decomposed by volatile organic acid; and the volatile organic acid was further decomposed. It is conceivable that the decomposition of volatile organic acid produces water and carbon dioxide.

EXAMPLE 3

Next, a light-load life test adhering to JIS D 5301 at 75° C. was conducted similarly to Example 1 on ten lead-acid batteries employing a polyethylene separator manufactured so as to contain di-2-ethylheptyl sodium sulfosuccinate as a surfactant at a rate of 0.5%, and on ten conventional lead-acid batteries (conventional battery) employing a polyethylene separator containing no surfactant. The result is shown in Table 5. The number of life cycles is expressed by the rate in which the average value of the conventional batteries is assumed to be 100.

TABLE 5

| Type of lead-acid battery | Number of life cycles |
|---|---|
| Conventional battery | 100 |
| Battery of the invention | Average 116 Maximum 118 Minimum 114 |

As shown in Table 5, also in the batteries which employ a polyethylene separator containing a surfactant, if the volatile organic acid concentration is 250 mg/L or lower, the same result was obtained as in Example 1.

EXAMPLE 4

No. 5 lead-acid battery in Example 2 contains volatile organic acid in the electrolyte at a concentration higher than 250 mg/L.

Consequently, this Example hereinafter discloses the case in which, in a lead-acid battery containing volatile organic acid at a concentration higher than 250 mg/L relative to the electrolyte, the volatile organic acid concentration is made equal to 250 mg/L or lower.

In Example 4, lead-acid batteries for an automobile were employed. They were 46B24L lead-acid batteries adhering to JIS D 5301 having a rated capacity of 36 Ah at $C_5$ Unformed positive and negative electrode plates for 46B24L were prepared by manufacturing by a fixed method; the negative electrode plate was inserted into a polyethylene separator of a bag shape; and the separator and the positive electrode plate were laminated alternatively, so as to form an electrode plate group. The separator employed here was manufactured so that the additive rate of the surfactant was made equal to 1.5%, thereby making the concentration of the volatile organic acid in the electrolyte higher than 250 mg/L. For the surfactant in this case, di-2-ethylheptyl sodium sulfosuccinate was employed. The electrode plate group was inserted into a container made of polypropylene resin, and a lid made of polypropylene resin was welded by heat to the container, so as to manufacture an unformed, 46B24L lead-acid battery. A prescribed amount of dilute sulfuric acid having a prescribed specific gravity was poured into the manufactured lead-acid battery.

Figure 5:
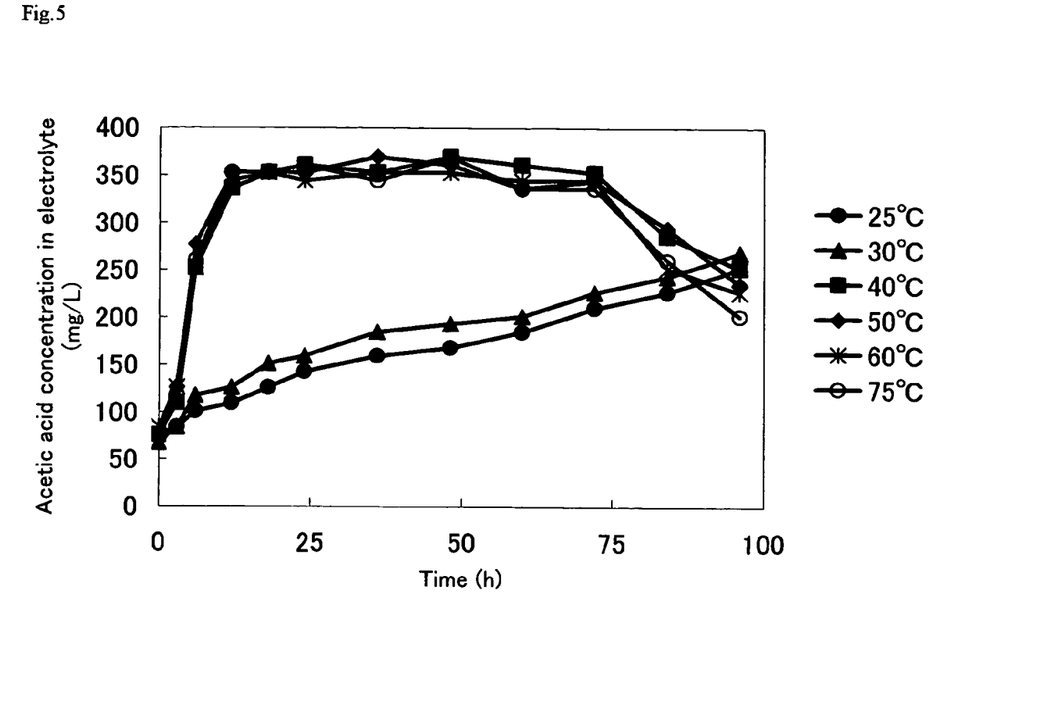
FIG. 5 shows the progression of the acetic acid concentration when the battery is left.

The lead-acid batteries which had completed the container formation were each left at ambient temperatures of 25° C., 30° C., 40° C., 50° C., 60° C., 70° C. and 75° C. In this case, the electrolyte was collected 0, 3, 6, 12, 18, 24, 36, 48, 60, 72, 84 and 96 hours after respectively, so as to analyze the concentration of the acetic acid in the electrolyte quantitatively. The acetic acid concentration was analyzed quantitatively by the same method as described in Example 1. FIG. 5 shows the analyzed result.

As shown in FIG. 5, at an ambient temperature of 40° C. or higher, the concentration of the acetic acid in the electrolyte reached an almost constant value when 12 hours passed. The reason can be considered as follows. The surfactant was quickly extracted into the electrolyte. The extracted surfactant was further oxidized by lead dioxide so as to produce acetic acid. The acetic acid concentration began to decrease 72 hour after, which is considered to be because the produced acetic acid gradually began to decompose into water and carbon dioxide. On the other hand, at an ambient temperature of 25° C. or 30° C., the acetic acid concentration increased slowly over time. This is considered to be because the surfactant was slowly extracted into the electrolyte, thereby producing the acetic acid slowly. It should be noted that the test was stopped at an ambient temperature of 75° C. because the discoloration of the polypropylene resin container was found.

After that, the lead-acid batteries left at 25° C., 30° C., 40° C., 50° C. and 60° C. for 12 hours or longer were charged at a rate of 0.5 CA. In the middle of the charge, the electrolyte was collected so as to analyze the acetic acid concentration quantitatively. The result is shown in FIG. 6.

Figure 6:
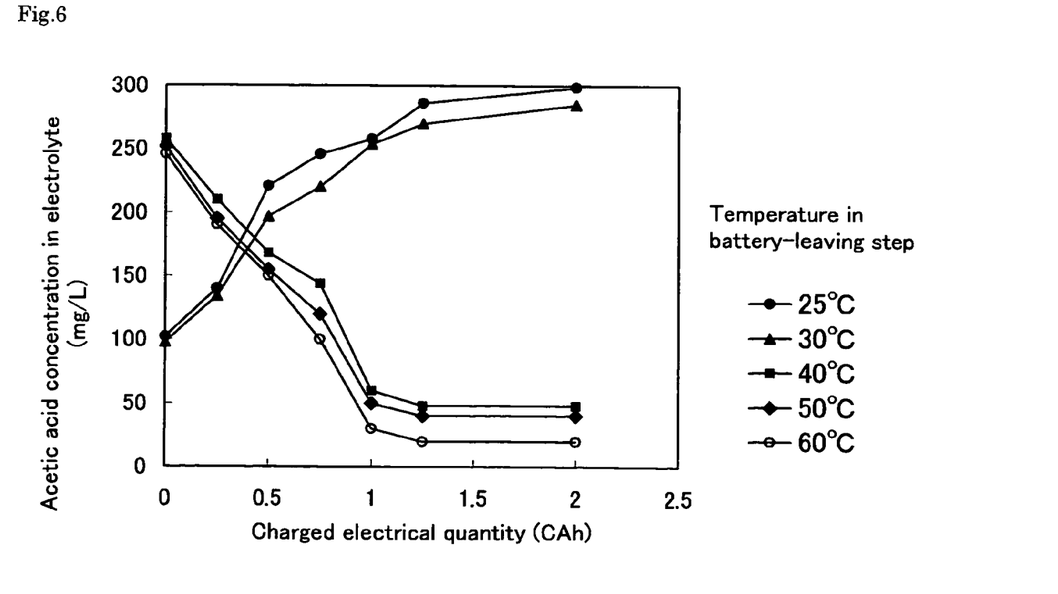
FIG. 6 shows how the temperature at the step in which the battery is left, effects on the progression of the acetic acid concentration at the step when the battery is charged.

As can be seen from FIG. 6, if leaving the battery at a temperature of 25° C. or 30° C., the acetic acid concentration increased to exceed 250 mg/L also when charging. The reason is to be considered as follows. Since the surfactant was not fully extracted when leaving the battery, the extraction of the surfactant continued even when charging the battery. As a result, the charged electricity was consumed for oxidizing the surfactant into acetic acid. On the other hand, when charging the lead-acid battery which had been left at a temperature of 40° C. or higher, the acetic acid concentration became equal to 250 mg/L or lower, by way of a charge equivalent to 1 CA. Specifically, acetic acid did not increase in amount. The reason can be considered as follows. Since the surfactant had already been exhausted by the extraction from the separator so as to become acetic acid, the charged electricity would not be consumed for producing acetic acid any longer. From the result described above, if the battery is left for 12 hours or longer at a temperature of 40° C. or higher, the acetic acid concentration can become equal to 250 mg/L or lower by subsequent charging step equivalent to the rated capacity.

Figure 7:
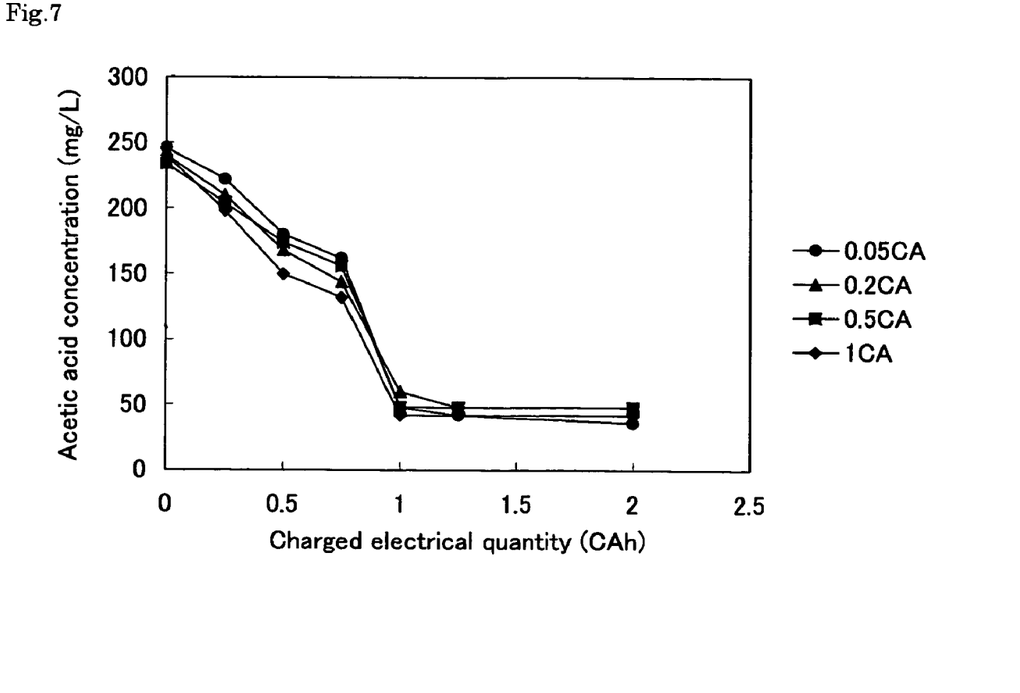
FIG. 7 shows the progression of the concentration of the acetic acid contained in the electrolyte.

The lead-acid batteries which had been left, were charged at a current of 0.05 $C_5$ A (1.8 A), 0.2 $C_5$ A (7.2 A), 0.5 $C_5$ A (18 A) and 1.0 $C_5$ A (36 A) respectively. The batteries were charged at an ambient temperature of 40° C. On this occasion, the electrolyte of the lead-acid battery was collected with respect to each prescribed electrical quantity to be charged, so as to analyze the concentration of the acetic acid in the electrolyte quantitatively. The result is shown in FIG. 7. In the figure, $C_5$ means the rated capacity a t 5 hour rate, and the 46B24L lead-acid battery had a rated capacity of 36 Ah as described above. Therefore, the charging current 0.05 $C_5$ A means that 36×0.05=1.8 A (hereinafter 5 of $C_5$ is omitted). The charged electrical quantity shown in FIG. 7, 1 CAh, for example, means that 1×36=36 Ah.

As shown in FIG. 7, regardless of quantity of the charging current, when the charged electrical quantity reached 1 CAh (36 Ah), the acetic acid concentration decreased down to 250 mg/L or lower, or the range which had no effect on the battery life of the lead-acid battery. On the other hand, further charging brought about almost no change in the acetic acid concentration. It is conceivable, therefore, that 1 CAh is required as the electrical quantity to be charged. It was also found that the electrical quantity to be charged required for obtaining an effect equivalent to this, is the electrical quantity equivalent to 30% of the theoretical capacity of the positive active material provided in the positive electrode.

The charging time required for charging 1 CAh varies depending on charging current. For example, when charging with a current of 0.1 CA, 10 hours is required in order to charge 1 CAh (36 Ah) while only two hours is required when charging at a current of 0.5 CA. However, a smaller charging current, which requires a larger number of hours, is unpractical in production. On the other hand, a charging current of 0.5 CA or larger reduces charging efficiency, thereby producing an increase in the battery temperature easily. Therefore, a lead-acid battery is commonly charged at a current of 0.5 CA or smaller. Consequently, in order both to make the charging time after leaving a battery as short as possible, and to obtain a good charging efficiency, the battery is preferably charged at a current of 0.2 CA to 0.4 CA.

Next, the lead-acid batteries which had undergone various steps were used for a light-load life test adhering to JIS D 5301 at 75° C. similarly to Example 1. The test conditions were the same as in Example 1. The result is shown in Table 6. Table 6 is expressed by the rate in which the life of the conventional battery is assumed to be 100.

TABLE 6

| No. | Leaving temperature | Leaving hours | Charged electrical quantity | Life cycle | Note |
| --- | --- | --- | --- | --- | --- |
| 1 | — | — | — | 100 | Conventional battery |
| 2 | 25° C. | 12 h | 0.5 CAh | 105 | Battery for comparison |
| 3 | 40° C. | 12 h | 0.5 CAh | 128 | Battery for comparison |
| 4 | 60° C. | 12 h | 0.5 CAh | 129 | Battery for comparison |
| 5 | 25° C. | 6 h | 1.0 CAh | 104 | Battery for comparison |

TABLE 6-continued

| No. | Leaving temperature | Leaving hours | Charged electrical quantity | Life cycle | Note |
|---|---|---|---|---|---|
| 6 | 25° C. | 12 h | 1.0 CAh | 108 | Battery for comparison |
| 7 | 25° C. | 24 h | 1.0 CAh | 115 | Battery for comparison |
| 8 | 40° C. | 6 h | 1.0 CAh | 125 | Battery for comparison |
| 9 | 40° C. | 12 h | 1.0 CAh | 135 | Battery of the invention |
| 10 | 40° C. | 24 h | 1.0 CAh | 137 | Battery of the invention |
| 11 | 60° C. | 6 h | 1.0 CAh | 131 | Battery for comparison |
| 12 | 60° C. | 12 h | 1.0 CAh | 138 | Battery of the invention |
| 13 | 60° C. | 24 h | 1.0 CAh | 139 | Battery of the invention |

As shown in Table 6, in No. 9, 10, 12 and 13 lead-acid batteries which had undergone the steps disclosed in the claims of the present application, the concentration of the volatile organic acid contained in the electrolyte of the lead-acid battery was 250 mg/L or lower. Therefore, similarly to Example 1, the effect of improving the life cycle of the lead-acid battery was obtained.

In these four Examples which have described above, 46B24L lead-acid batteries for an automobile were employed. However, it is needless to say that a similar effect can be obtained with other lead-acid batteries as long as they meet the requirements of the present invention. The present inventors conducted a similar assessment on other types of lead-acid batteries for automobile and industrial lead-acid batteries, so that similar results were obtained

INDUSTRIAL APPLICABILITY

By making the concentration of the volatile organic acid contained in the electrolyte of a lead-acid battery equal to 250 mg/L or lower, the capacity of the lead-acid battery was increased and the battery life thereof was improved. By employing a separator which contains a surfactant as a separator of the lead-acid battery, volatile organic acid can be produced in the lead-acid battery. In a method of manufacturing a lead-acid battery, by undergoing the first step in which the lead-acid battery is container-formed; the second step in which the battery is left at 40° C. or higher for 12 hours or longer; and the third step in which the lead-acid battery is charged so that the charged electrical quantity is equal to the rated capacity or larger, the lead-acid battery which has undergone these steps can make the volatile organic acid concentration equal to 250 mg/L or higher.

As has been described above, the present invention relates to a lead-acid battery with an improved performance. The present invention, therefore, is industrially applicable, and its industrial advantage is extremely large.

The invention claimed is:

1. A lead-acid battery which comprises a positive electrode, a negative electrode, a separator, and an electrolyte, said electrolyte containing sulfuric acid, wherein:
   said separator contains a surfactant,
   said electrolyte contains a volatile organic acid, and
   the content of said volatile organic acid is equal to 250 mg or lower per liter of said electrolyte and said volatile organic acid is selected from a group consisting of $CH_3COOH$, $C_2H_5COOH$, n-$C_3H_7COOH$, iso-$C_3H_7COOH$, and mixtures thereof.

2. The lead-acid battery according to claim 1, wherein the content of said volatile organic acid is equal to 12 mg or higher per liter of said electrolyte.

3. The lead-acid battery according to claim 1 or 2, wherein said separator is composed of polyethylene.

4. A method of manufacturing a lead-acid battery which comprises a positive electrode, a negative electrode, a separator, and an electrolyte, the electrolyte containing sulfuric acid, wherein:
   said separator contains a surfactant;
   said electrolyte contains a volatile organic acid; and
   the content of the volatile organic acid is equal to 250 mg or lower per liter of said electrolyte; and
   wherein said method comprises a first step in which said lead-acid battery is container-formed; a second step in which said lead-acid battery is left at 40° C. or higher for 12 hours or longer; and a third step in which said lead-acid battery is charge so as to make a charged electrical quantity equal to a rated capacity or larger and wherein said volatile organic acid is selected from a group consisting of $CH_3COOH$, $C_2H_5COOH$, n-$C_3H_7COOH$, iso-$C_3H_7COOH$, and mixtures thereof.

5. A method of manufacturing a lead-acid battery which comprises a positive electrode, a negative electrode, a separator, and an electrolyte, the electrolyte containing sulfuric acid, wherein:
   said separator contains a surfactant;
   said electrolyte contains a volatile organic acid; and
   the content of the volatile organic acid is equal to 250 mg or lower per liter of said electrolyte; and
   wherein said method comprises a step of leaving said lead-acid battery at 40° C. or higher for 12 hours or longer, followed by charging said lead-acid battery with 30% or higher of a theoretical capacity of a positive active material provided in said positive electrode; and wherein said volatile organic acid is selected from a group consisting of $CH_3COOH$, $C_2H_5COOH$, n-$C_3H_7COOH$, iso-$C_3H_7COOH$, and mixtures thereof.

6. The method of manufacturing the lead-acid battery according to claim 4, wherein said separator is composed of polyethylene.

7. The method of manufacturing the lead-acid battery according to claim 5, wherein said separator is composed of polyethylene.

* * * * *